United States Patent
Eriksson et al.

(10) Patent No.: US 9,174,624 B2
(45) Date of Patent: Nov. 3, 2015

(54) METHOD AND DEVICE FOR PREVENTING A SURGING OF FLUIDS IN A TANK OF A TANK TRUCK

(75) Inventors: Anders Eriksson, Torslanda (SE); Johan Bjernetun, Göteborg (SE)

(73) Assignee: Volvo Lastvagnar AB, Göteborg (SE)

(*) Notice: Subject to any disclaimer, the term of this patent is extended or adjusted under 35 U.S.C. 154(b) by 407 days.

(21) Appl. No.: 13/128,412

(22) PCT Filed: Nov. 10, 2008

(86) PCT No.: PCT/SE2008/000636
§ 371 (c)(1),
(2), (4) Date: Jun. 10, 2011

(87) PCT Pub. No.: WO2010/053411
PCT Pub. Date: May 14, 2010

(65) Prior Publication Data
US 2011/0307151 A1    Dec. 15, 2011

(51) Int. Cl.
*B60W 30/18* (2012.01)
*B60W 10/10* (2012.01)
*B60W 10/02* (2006.01)
*B60P 3/22* (2006.01)
*F16H 61/02* (2006.01)
*B60W 10/06* (2006.01)
*B60W 10/11* (2012.01)

(52) U.S. Cl.
CPC .............. *B60W 10/02* (2013.01); *B60P 3/2235* (2013.01); *B60W 10/06* (2013.01); *B60W 10/11* (2013.01); *B60W 30/18027* (2013.01); *B60W 2530/10* (2013.01); *B60W 2560/02* (2013.01)

(58) Field of Classification Search
None
See application file for complete search history.

(56) References Cited

U.S. PATENT DOCUMENTS

| 5,765,121 | A  | * | 6/1998 | Schwager et al. | 701/104 |
|---|---|---|---|---|---|
| 5,878,365 | A  | * | 3/1999 | Onogi et al. | 701/70 |
| 6,324,447 | B1 | * | 11/2001 | Schramm et al. | 701/1 |
| 6,452,487 | B1 | * | 9/2002 | Krupinski | 340/440 |
| 7,171,867 | B2 | * | 2/2007 | McCrary et al. | 74/331 |
| 7,561,953 | B2 | * | 7/2009 | Yu | 701/78 |
| 8,051,882 | B2 | * | 11/2011 | Koeninger et al. | 141/95 |

(Continued)

FOREIGN PATENT DOCUMENTS

| DE | 102005021415 A1 | 11/2006 |
|---|---|---|
| EP | 1138985 A2 | 4/2001 |

(Continued)

OTHER PUBLICATIONS

International Search Report for corresponding International Application PCT/SE2008/000636.

*Primary Examiner* — John R Olszewski
*Assistant Examiner* — Jean-Paul Cass
(74) *Attorney, Agent, or Firm* — WRB-IP LLP

(57) ABSTRACT

A method and device for preventing a surging of fluids in a tank of a tank truck, during transportation, the tank truck having a drive train including an internal combustion engine, a clutch device and an automatic or automated transmission device, and the drive train is controlled by an electronic control unit (ECU), which is prepared to receive input data from an arrangement for detecting a tank drive mode and sensors for sensing a load status of the tank truck. The method includes detecting a tank drive mode, calculating a launch gear, and limiting the clutch device torque gradient.

14 Claims, 2 Drawing Sheets

(56) References Cited

U.S. PATENT DOCUMENTS

| | | | |
|---|---|---|---|
| 8,055,418 B2* | 11/2011 | Dreier et al. | 701/62 |
| 2005/0221759 A1* | 10/2005 | Spadafora et al. | 455/41.2 |
| 2007/0255473 A1* | 11/2007 | Christofl et al. | 701/67 |
| 2008/0217874 A1* | 9/2008 | Miskin | 280/6.151 |
| 2008/0288146 A1* | 11/2008 | Beechie et al. | 701/58 |
| 2009/0312144 A1* | 12/2009 | Allgaier et al. | 477/5 |
| 2010/0256882 A1* | 10/2010 | Dreier et al. | 701/62 |
| 2012/0252629 A1* | 10/2012 | Jung et al. | 477/79 |

FOREIGN PATENT DOCUMENTS

| | | |
|---|---|---|
| GB | 2200957 A | 8/1988 |
| WO | 8701101 A1 | 2/1987 |
| WO | 8905248 A1 | 6/1989 |
| WO | 0208640 A1 | 1/2002 |

\* cited by examiner

METHOD AND DEVICE FOR PREVENTING A SURGING OF FLUIDS IN A TANK OF A TANK TRUCK

BACKGROUND AND SUMMARY

The present invention relates to a method for preventing a surging of fluids in a tank of a tank truck, during transportation. Said tank truck having a drive train comprising an internal combustion engine, a clutch device and an automatic or automated manual transmission.

It is well known that fluids in a partly filled up tank of a tank truck surges around in the tank during transportation. The surging in the tank influences the vehicle's driving performance. Due to the inertial reactions of the fluid, for example during accelerations, retardations, and transportation during poor conditions, such as bumpy and uneven roads, low frequency oscillations of the vehicle might occur. The acceleration, retardation, and transportation with the vehicle becomes uneven as the longitudinal oscillations acts with or against the wanted acceleration or retardation respectively. These longitudinal oscillations of the vehicle are apprehended as very unpleasant by the driver of the vehicle and are also unwanted seen from a safety point of view.

There are several known solutions to dampen the problem with surging in the tank and low frequency longitudinal oscillations of the vehicle. The most common one is to build in some sort of surging inhibiting device in the tank. Such a surging inhibiting device is usually supposed to divide the tank volume in smaller sections, so that the movement of the fluid decreases. There are several different forms of surging inhibiting devices, for example in WO 87 01101 an Ω-shaped anti-surging element is suggested, which can be fitted inside a tank. There are several problems with surging inhibiting devices like this one. Firstly, they can not prevent the occurring of the low frequency longitudinal oscillations of the vehicle. These solutions can only dampen them. Secondly, the material usage for these solutions is mostly quite high and makes the vehicle heavier and takes up important transport room. Thirdly, the extra structure in the tank makes the tank much harder to clean, which especially in a tank for provisions is a problem.

In DE 10 2005 021 415 a method is suggested to dampen longitudinal oscillations of a tank truck, wherein the oscillations are derived from a fluid in the tank of the tank truck. The method uses the realization that an oscillation counteracting the oscillation derived from the fluid can neutralise the unwanted vehicle oscillations derived from the fluid.

The present invention uses, according to an aspect thereof, the realisation that a preventing of the surging in the tank, would improve the safety for tank trucks. With known methods, the unwanted vehicle oscillations must occur before they can be neutralised, which means that it still will be a period of time as the tank truck is exposed to the low frequency longitudinal oscillations.

Thus, it is desirable to suggest a method which prevents the occurring of low longitudinal oscillations of a tank truck, derived from surging in a partly filled up tank. It is also desirable to suggest a device for controlling the drive train of such tank trucks.

The present invention relates, according to an aspect thereof, to a method for preventing a surging of fluids in a tank of a tank truck having a tank for transportation of fluids. The drive train comprises an internal combustion engine, a clutch device and an automatic or automated manual transmission. Further the drive train is controlled by an electronic control unit, which is prepared to receive input data from detecting means for detecting a tank driving mode and sensing means for sensing a load status of the vehicle.

The inventive method according to an aspect of the invention comprises the steps of:
 detecting a tank drive mode,
 calculating a launch gear, and
 limiting the torque gradient of the clutch device.

The detecting means for detecting a tank drive mode can for example be a manual device controlled by a driver, for example a button, an arm or any other kind of switch inside the drivers cabin of the tank truck. The driver activates the tank drive mode through the switch when the tank truck is driving with a partly filled tank. Another example of a possible detecting means can be a sensor, which detects if a tank load is connected to the truck and preferably also detect that the tank is partly filled. The sensing means sends input data to the ECU when a tank load, i.e. a tank drive mode, is detected. The detecting means for detecting a tank drive mode can also be an ECU which activates the tank driving mode upon detection of a predetermined vehicle behaviour. Said mentioned different detecting means for detecting a tank drive mode can be combined. Said automatic transmission can be a step geared planetary gear based transmission. Said automated manual transmission (AMT) is a step geared transmission with a counter shaft arrangement.

A launch gear for the tank truck is calculated from the tank truck data, such as drive train specifics and the mass of the tank truck together with the data collected from the sensing means. The aim is to find a launch gear that is as high as possible, but still can offer enough torque to launch the tank truck. In this way a smooth launch of the tank truck will be possible. Mostly this will result in that the start gear is one gear higher than with a launch with a correspondent solid load. For example: A 12 speed, 40 ton truck, would normally launch from its second gear. With a tank drive mode activated the same truck would launch from its third gear.

To further facilitate a smooth start of the tank truck and additional a smooth gear change the torque gradient of the clutch device is limited. The clutch device can be a friction clutch or a torque converter of any kind that fulfil the purpose as a disengagable/engagable torque transmitting element in a drive line. Due to the limited torque gradient the clutch device will disengage and engage slower and therefore enclose a longer period of slip during its disengagement and engagement. Hence a smoother transition from a still standing position by launching the tank truck and between the different gears during a gear change will be realized.

In a further embodiment of said invention and after said step of detecting a tank drive mode and prior to calculating a launch gear the inventive method can further comprise the step of:
 sensing a load status of the tank truck.

As the ECU receives the input data from the detecting means that a tank load is present, the sensing means for sensing the load status of the tank truck is called up by the ECU and the ECU receives input data from the sensing means. The sensing means can alternatively also have the function as a detecting means. The sensing means can for example be sensors in the tank, and that said sensors can identify the load, the fill level and preferably other fluid specifics. Such sensors could be pressure sensors and/or fluid presence sensors and/or fill level sensors and/or viscosity sensors and/or alternative sensors, which could sense the wanted data. Alternatively the sensing means can be an information device, in which an operator manually or automatically specifies the load data, such as; fill level and/or density and/or viscosity and/or any other relevant data. The manual specification of the data can for example be done through a keyboard, a touch screen or the like and an semi-automatically or automatically specification in the information device can for example be done through scanning of a barcode or the like, or be transmitted to the device. A further possibility is a device in combination with sensors.

The inventive method embodiments suggest a tank drive mode to control a drive line of a tank truck. The method will during launch and travel, minimize or even avoid dangerous surging of a fluid in the tank, causing low frequency longitudinal oscillations of the tank truck. Due to the inventive method safety for the driver of the tank truck and the fellow road-users is significantly increased. Further, a cleaning of the tank is simplified, since the need for anti-surging elements in the tank is reduced.

In a further embodiment according to an aspect of the inventive method the following additional steps are suggested:
  limiting the engine torque gradient, and/or
  reducing the gear change velocity in a vehicle acceleration, and/or
  disabling a kick down function.

Due to that the engine torque gradient is limited a driver's sudden and fast and/or large difference in demanded torque will not result in a corresponding engine torque increase or decrease. Instead the ECU will control the engine torque in such a way that it slowly increases or decreases until it reaches the, from the driver or from a cruise control, demanded torque. A softer acceleration or retardation, which leads to less surge in the tank will be the result. A smoother gear change will be achieved through the suggested transmission control, which reduces the gear change velocity of the tank truck during vehicle acceleration. The gear change will be performed earlier than if the truck would drive with a solid load. With earlier is meant; at a lower engine speed and as a result thereof at a lower velocity of the tank truck. For example: A 12 speed, 40 ton truck, would have its gear change engine speed at 1900 rpm, for a three step gear change, and at 1700 rpm, for a two step gear change, and at 1550 rpm, for a one step gear. The same truck with a tank drive mode activated, would avoid a three step gear change, and have it gear change speed at 1600 rpm, for a two step gear change, and at 1450 rpm, for a one step gear change.

A third measure is suggested, which disables a "kick down" function. This, since the "kick down" function endeavors a fast change in torque, which contradicts the soul of this invention. The suggested additional steps are independent of each other; therefore one of the additional steps or any combination of the additional steps can be included in the tank drive mode.

If the mass of the load is unknown through the sensing means a calculation of the mass of the load must be done by the ECU. Known methods to calculate the mass of the load during launch are based on the relationship between acceleration and driving force or acceleration, vehicle speed and opening of a throttle valve. Such a method collects data from the engine and the drive train during a fix and mostly short time period. Due to the inertial reaction of the fluid such a method will end up false if this is not included in the calculation.

An improved method to calculate the mass of the tank truck during the launch of the vehicle is suggested. The improved method suggests that in addition to the relation between engine data and drive train data respectively and the vehicle acceleration and/or speed and/or throttle opening, a compensation for the inertial reaction of the fluid is done. This could be a longer sensing period for collecting data for the calculation, and that the longer sensing period permits a compensation of the inertial reaction of the fluid.

An extension of the inventive method involves measures for reducing the occurrence of surging during retardation. The extended method comprises the steps of:—limiting the brake gradient, caused by an auxiliary braking system of the tank truck, and/or
  reducing the gear change velocity of the tank truck during an retardation and/or
  avoiding high engine rotational speeds and or—disabling a brake mode.

By reducing the brake gradient of an auxiliary braking system of the tank truck a smoother engagement of the brake will be achieved and the risk of surging in the tank, due to the braking will be reduced. An auxiliary braking system is for example a retarder, an exhaust braking system or engine braking system (engine compression brake). A limiting of the primary braking system (service brakes) is not recommended, due to safety reasons. The reduced gear change velocity of the tank truck during retardation results in a smoother gear change, i.e. the gear change will be performed later than normal in order to decrease the difference in torque when the clutch device opens and closes. By avoiding high engine rotational speeds the risk of exposing the drive train to sudden torque changes will be decreased and the risk of surging in the tank will be reduced. In an alternative embodiment of the invention a special automatic braking program can be hindered to be activated in order to limit the risk of surging in the tank. Such a special automatic braking program when activated can typically be arranged to maximize engine braking by using high engine rotational speeds, i.e. the transmission down shifts as many gear steps as possible.

Even though the inventive method aims, according to an aspect thereof, to minimize the occurrence of longitudinal oscillations due to surging in the tank, it is possible that such oscillations occur due to other circumstances. Therefore, it is suggested that an aspect of the inventive method as an alternative comprises the steps of:
  detecting low frequency longitudinal oscillations of the tank truck, derived from the fluid in the tank, and—
  calculating the timing and intensity of the next change in torque, with the requirement that the next change in torque will counteract with the low frequency longitudinal oscillations of the tank truck.

A detection of the low frequency longitudinal oscillations of the tank truck can be made in the drive train. In today's vehicles a plurality of sensor are present in the drive train, to monitor the behaviour of the drive train. For example the sensors are present in the engine, the transmissions, the differential and/or the wheels. Also the low frequency longitudinal oscillations of the tank truck can be traced in the information from these sensors. The low frequency longitudinal oscillations of the tank truck will influence the drive train, so that also the drive train shows these low frequency oscillations. The low frequency oscillations in the drive train, derived from surging in the tank, can be separated from other oscillations in the drive train, for example derived from the engine or the transmission since these oscillations show a much higher frequency. Thus, the information from the sensors can be analyzed in the ECU and when low frequency oscillations, derived from the fluid in the tank is found, the ECU calculates the timing and intensity of the next change in torque, so that this change counteract with the low frequency oscillations in the drive train. Such a counteraction can contradict the conditions of the tank drive mode. The ECU can therefore in a situation with low frequency longitudinal oscillations of the tank truck overrule previous conditions to be able to counteract the low frequency oscillations. For example, an abrupt and sudden disengagement or engagement of the clutch device can be allowed. In an alternative embodiment said plurality of available sensors can be used for comparison of engine output torque and vehicle acceleration. If the fluid in the tank is moving the engine torque and the vehicle acceleration will walk out of step. This can be used for detection of a surging fluid in the tank.

To further improve the inventive method it is suggested that the method comprises the steps of:—storage of detected and calculated data in a storage means, and the electronic control unit accessing the data in the storage means instead of detecting and/or calculating new data when the tank circumstances are unchanged, and—replacing existing data in the storage means, when new data has been detected, and recalculating the data for the tank drive mode when detected data has changed.

According to the suggested steps of the inventive method the detected and calculated data is stored in a storage means, such as a RAM, and can at any time be accessed by the electronic control unit to write new data or read saved data. As long as the tank circumstances are unchanged the data from the storage means is preferably used. When new data has been detected, it will replace the previous data in the storage means and the tank drive mode data, such as launch gear and gear change patterns are recalculated based on the new data, whereupon the recalculated data is stored in the storage means.

In a variant of the inventive method an inlet or an outlet from the tank is automatically detected. Advantageously the, in the tank filled up volume or the, from the tank drained off volume is detected by sensing means. In this way the ECU will always sense if a volume of the fluid in the tank has changed and therefore have to recalculate new values, such as launch gear and gear change patterns. Especially in tank trucks that are filled and/or drained at several stations this would be a preferred feature. Such tank trucks could be tank trucks for milk transportation or heating oil for private houses. These trucks may already be equipped with such detecting/sensing means and these could then be connected with the ECU to communicate the detected values.

BRIEF DESCRIPTION OF THE DRAWINGS

The invention will be described in greater detail below with reference to illustrative, embodiments which are shown in the accompanying drawings, in which.

DETAILED DESCRIPTION

Figure 1:
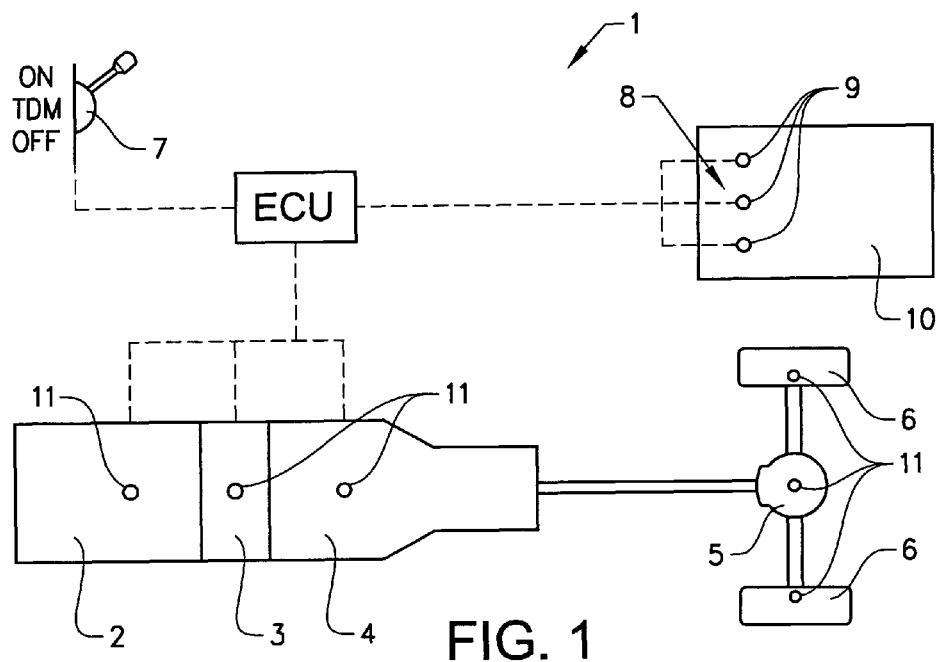
FIG. 1 is a schematic view of an embodiment of an inventive device.

In FIG. 1 a schematic view of a tank truck 1 according to the invention is shown. The tank truck 1 encloses a drive train with an engine 2, a clutch device 3, a transmission 4, a differential 5 and two wheels 6. The drive train is controlled by an electronic control unit ECU. In accordance with the invention the ECU receives signals from a tank drive mode (TDM) detecting unit 7 in a driver's cabin. To collect data of the tank load status the ECU uses the sensing means 8, which are sensors 9 having access to the tank 10.

When the driver positions the TDM detecting unit 7 in the position ON a signal is sent to the ECU that TDM is activated. The ECU will then collect relevant data from the sensors 9. Using the collected data and known drive train data the ECU calculates the TDM data, such as launch gear, limited torque gradient for clutch device 3 and engine 2.

Further sensors 11 are present in the drive train. The sensors 11 monitor the drive train, and through these sensors 11 low frequency oscillations are detected in the drive train.

Figure 2:
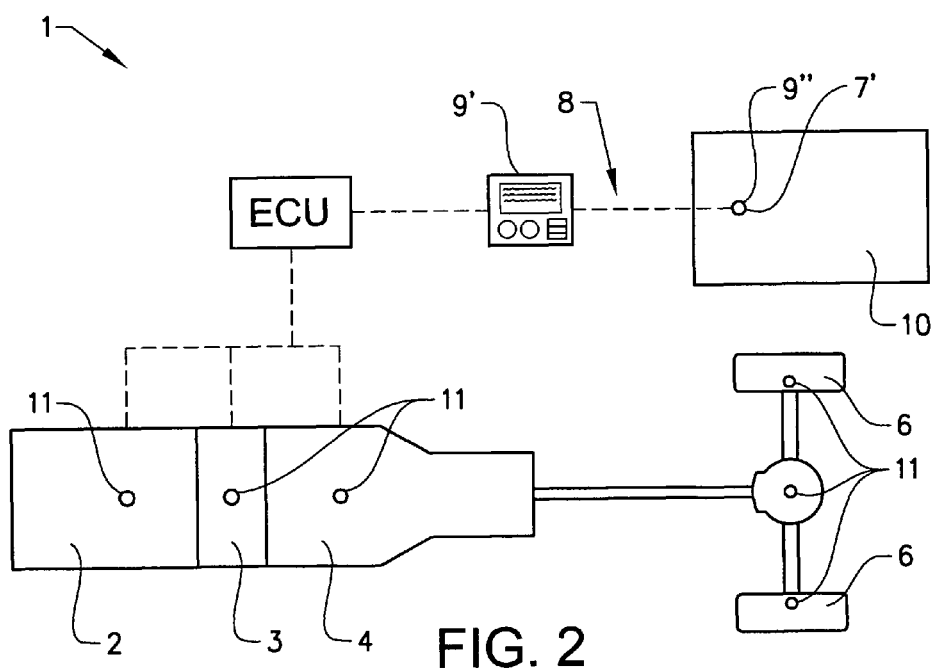
FIG. 2 shows a schematic view of a second embodiment of an inventive device.

FIG. 2 shows a second schematic view of a tank truck 1, in which the parts corresponding to the same parts as in FIG. 1 has been provided with the same reference number. The embodiment according to FIG. 2 is provided with the sensing means 8, which comprises a manual device 9' and a sensor means 9". In the manual device 9' an operator can specify the specifics of the fluid in the tank 10, such as density, viscosity, etc. The sensor means 9" can sense the presence of a fluid in the tank 10 and preferably also the fill level of the tank 10. The sensor means 9" can also be used as detecting means T to send a signal to the ECU that a fluid is present in the tank 10 and the tank is just partly filled. The ECU then starts the TDM.

Figure 3:
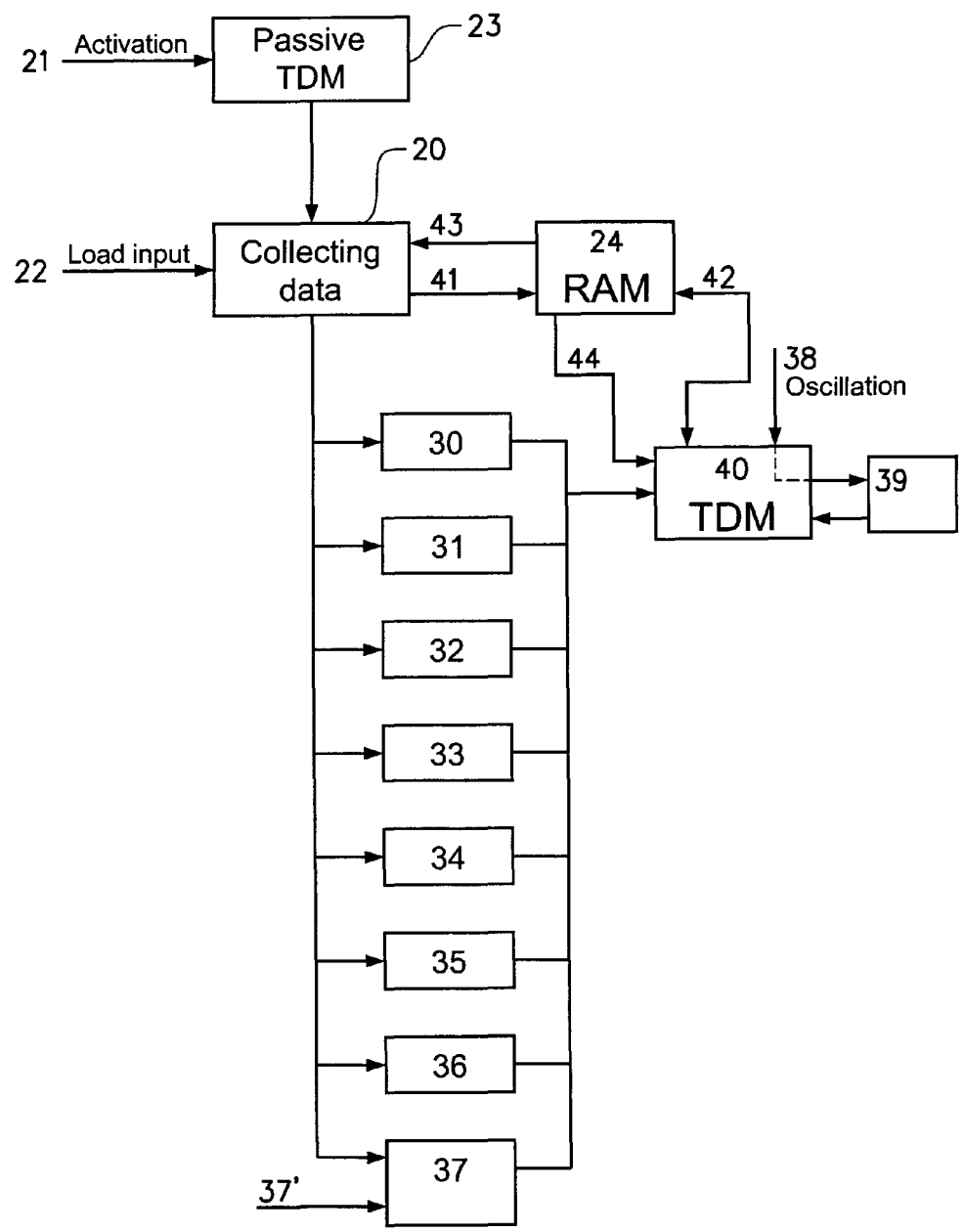
FIG. 3 shows a flow chart of the inventive method.

In the flow chart in FIG. 3 the inventive method is illustrated as used in a tank truck 1 from FIG. 1 or 2. The method starts with that the passive TDM 23 is activated with an activation signal 21 from the detecting means 7. As the TDM is activated the ECU starts to collect load information 20 from the sensing means 8 via a load input signal 22. The collected information 20 about the load is saved (41) in a storage means, RAM 24. If previous load data already exists in the storage means 24 the new load data replaces the previous load data. After the load data is collected the ECU calculates the TDM data. If the load data is consistent, then the existing load data can be read 43 by the ECU from the storage means 24. The calculation of the TDM data is done in the flow chart boxes 30, 31, 32, 33, 34, 35 and 36. When, all the data is calculated the tank truck is ready to launch and be driven in a tank drive mode 40. Also the calculated TDM data is saved 42 in the storage means 24. The saved TDM data 24 are read 44 by the ECU, as long as the load data is consistent.

The core TDM method consists of or comprises the steps with the flow chart numbers 20, 21, 22, 23, 30, 31 and 40. The method steps 32, 33, 34, 35, 36, 37, 38 are optional and one or a plurality of the optional method steps 32, 33, 34, 35, 36, 37, 38 can be included in the method.

The compulsory method step 30 involves calculation of a launch gear.

The compulsory method step 31 involves limiting the torque gradient of the clutch device.

The optional method step 32 involves a limiting of a torque gradient of the engine. The optional method step 33 involves a reducing of a gear change velocity of the tank truck during acceleration.

The optional method step 34 involves a disabling of a kick down function

The optional method step 35 involves limiting the brake gradient of an auxiliary braking system.

The optional method step 36 involves a reducing of the gear change velocity of the tank truck during retardation. The optional method step 37 involves detecting 37' the data for mass calculation 37 of the tank truck throughout an extended period of time during launch of the tank truck, and considering the inertial reaction of the fluid in the mass calculation 37.

The optional method step 38 and 39, involves detecting 38 a low frequency longitudinal oscillation of the tank truck derived from surging in the tank and sending a signal to the ECU with the detected oscillation. The ECU then calculates 39 the timing and intensity of the next change in torque in the drive train to counteract the low frequency longitudinal oscillation of the tank truck.

None, one or a plurality of the optional method steps can be included in the method.

In an alternative embodiment of the invention said activation signal 21 can be the outcome of an ECU comparing engine output torque and vehicle acceleration. If the fluid in the tank is surging the engine torque and the vehicle acceleration will walk out of step. Thus, if the ECU detects that the engine torque and vehicle acceleration has walked out of step said ECU can be programmed to initiate said activation signal 21 and the inventive procedure will continue as described above in connection to FIG. 3.

The invention claimed is:

1. A method for preventing a surging of fluids in a tank of a tank truck, during transportation, the tank truck having a drive train comprising an internal combustion engine, a clutch device and an automatic or automated manual transmission, the drive train being controlled by an electronic control unit which is configured to receive input data from detecting means for detecting a tank drive mode and sensing means for sensing a load status of the tank truck, the method comprising the steps of:
    detecting a tank drive mode, and
    preventing surging of fluids in the tank by
        calculating a launch gear as a function of detection tank drive mode and the load status of the tank truck, and
        limiting a clutch device torque gradient as a function of detection of tank drive mode and the load status of the tank truck.

2. A method as described in claim 1, comprising sensing the load status of the tank truck after detecting a tank drive mode and prior to calculating a launch gear.

3. A method as described in claim 2, comprising at least one of:
    limiting an engine torque gradient,
    reducing a gear change velocity, and
    disabling a kick down (KD) function.

4. A method as described in claim 1, wherein the tank drive mode is detected by at least one of operation by a driver of a manual device and by sensor means.

5. A method as described in claim 1, wherein the electronic control unit receives load data relating to the load status of the tank truck from the sensing means, and the calculation of the launch gear is dependent of the received load data, which includes at least one of a fill level of the tank, a density of the fluid, a viscosity of the fluid, and a mass of the tank truck.

6. A method as described in claim 1, comprising
    detecting data for mass calculation of the tank truck th during launch of the tank truck, and considering inertial reaction of the fluid in the mass calculation.

7. A method as described in claim 1, comprising at least one of
    limiting a brake gradient of auxiliary braking systems of the tank truck,
    reducing a gear change velocity of the tank truck during retardation,
    avoiding high engine rotational speeds, and
    disabling a brake mode.

8. A method as described in claim 1, comprising
    detecting longitudinal oscillations resulting from surging of fluid in the tank, and
    calculating a timing and intensity of a next change in engine torque so that the next change in torque produces longitudinal oscillations in the drive line that counteracts the longitudinal oscillations resulting from surging of fluid in the tank.

9. A method as described in claim 1, comprising
    storing detected and calculated data in a storage means, and
    accessing via the electronic control unit the data in the storage means instead of detecting or calculating new data when tank circumstances are unchanged, and
    replacing existing data in the storage means when new data is detected, and
    recalculating tank drive mode data when detected data changes.

10. A method as described in claim 1, comprising at least one of
    detecting an inlet to or an outlet from the tank, and
    detecting a filled up volume in or drained off volume from the tank.

11. A device for monitoring a tank truck, comprising
    a tank for transportation of fluids, and
    an electronic control unit, the electronic control unit being arranged to monitor processes of the tank truck, the electronic control unit being prepared to receive input data from detecting means for detecting a tank drive mode and from sensing means for sensing a load status of the tank truck,
    wherein the detecting means comprises at least one of sensors in the tank, a command unit via which a driver can activate the tank drive mode, and the electronic control unit arranged to activate the tank driving mode upon detection of a predetermined vehicle behaviour,
    the electronic control unit being arranged to prevent surging of fluids in the tank by calculating a launch gear as a function of detection of tank drive mode and the load status of the tank truck, and limiting a clutch device torque gradient as a function of detection of tank drive mode and the load status of the tank truck.

12. A device as described in claim 11, wherein the sensing means comprises at least one of sensors in at least one of the tank, the tank inlet, and the tank outlet, and an input unit that permits an operator to specify contents of the tank.

13. A device as described in claim 11, wherein the electronic control unit is connected to a storage means in which load data and calculated data can be stored.

14. A tank truck comprising
    a tank for transportation of fluids, and
    a device for monitoring the tank truck, the device comprising
        an electronic control unit, the electronic control unit being arranged to monitor processes of the tank truck, the electronic control unit being prepared to receive input data from detecting means for detecting a tank drive mode and from sensing means for sensing a load status of the tank truck,
    wherein the detecting means comprises at least one of sensors in the tank, a command unit via which a driver can activate the tank drive mode, and the electronic control unit arranged to activate the tank driving mode upon detection of a predetermined vehicle behaviour,
    the electronic control unit being arranged to prevent surging of fluids in the tank by calculating a launch gear as a function of detection of tank drive mode and the load status of the tank truck, and limiting a clutch device torque gradient as a function of detection of tank drive mode and the load status of the tank truck.

\* \* \* \* \*